United States Patent [19]
Drews et al.

[11] Patent Number: 6,094,902
[45] Date of Patent: Aug. 1, 2000

[54] CARRIER LINK HAVING REMOVABLE CROSSBAR WITH OPPOSITE ENDS SNAP-FITTED ON CROSS-SECTIONALLY T-SHAPED PROTRUSIONS

[75] Inventors: Steven R. Drews, Cambria; Kevin I. Pea, Mayville, both of Wis.

[73] Assignee: Hubbell Incorporated, Orange, Conn.

[21] Appl. No.: 09/359,721

[22] Filed: Jul. 23, 1999

[51] Int. Cl.[7] .................................................. F16G 13/16
[52] U.S. Cl. ............................................. 59/78.1; 248/49
[58] Field of Search ....................... 59/78.1, 900; 248/49, 248/51

[56] References Cited

U.S. PATENT DOCUMENTS

| | | | |
|---|---|---|---|
| 4,626,233 | 12/1986 | Moritz | 59/78.1 |
| 5,038,556 | 8/1991 | Moritz et al. | 59/78.1 |
| 5,184,454 | 2/1993 | Klein et al. | 59/78.1 |
| 5,201,885 | 4/1993 | Wehler et al. | 59/78.1 |

*Primary Examiner*—David Jones
*Attorney, Agent, or Firm*—Jerry M. Presson; Michael R. Swartz

[57] ABSTRACT

An elongated carrier for holding and protecting lengths of cable and hose includes a plurality of substantially identical links pivotally interconnected to one another in an end-to-end arrangement. Each link includes a pair of sidewalls and a pair of crossbars. The sidewalls has opposite upper and lower portions extending between opposite end portions and a pair of protrusions being cross-sectionally T-shaped and attached to and projecting toward one another from one of the opposite upper and lower portions of the sidewalls. Each protrusion has spaced apart opposite outer and inner portions, spaced apart opposite side portions extending between and forming outer and inner pairs of corners with the opposite outer and inner portions, and recesses defined respectively at the inner pairs of corners adjacent to the inner portion of the protrusion to provide the cross-sectional T-shape of the protrusion. The crossbars are vertically spaced apart and extend transversely between the sidewalls adjacent to the opposite upper and lower portions thereof so as to laterally space the sidewalls apart from one another. One of the crossbars is fixedly attached to and extends between the other of the opposite upper and lower portions of the sidewalls while the other of the crossbars is removable and cross-sectionally channel-shaped and has opposite ends removably snap-fittable over and partially about the outer portions and opposite side portions of the protrusions and into the pair of recesses at the one pair of corners of the protrusions.

20 Claims, 2 Drawing Sheets

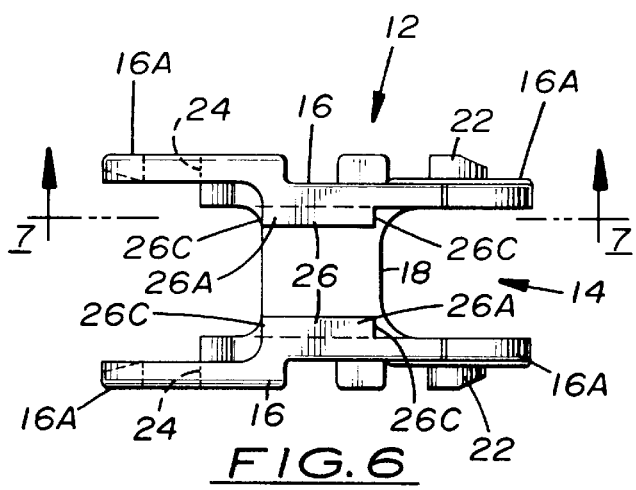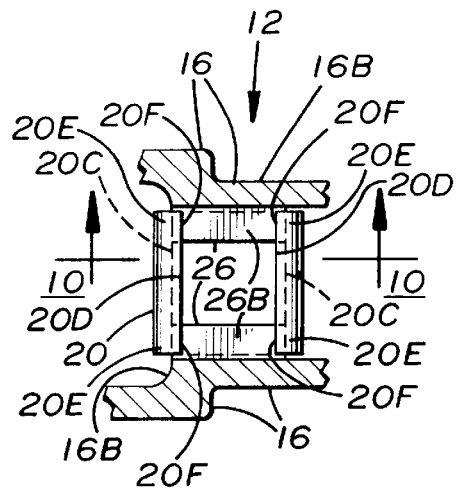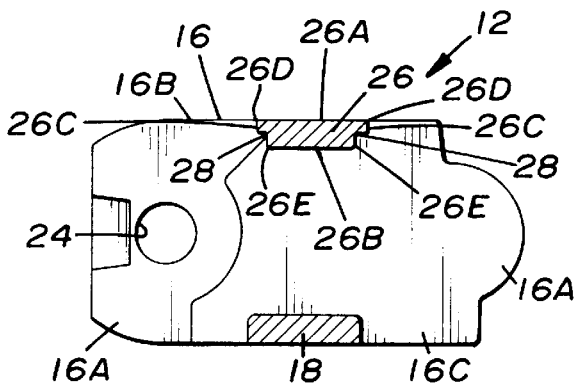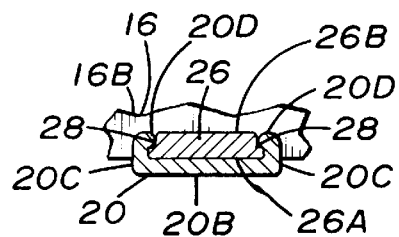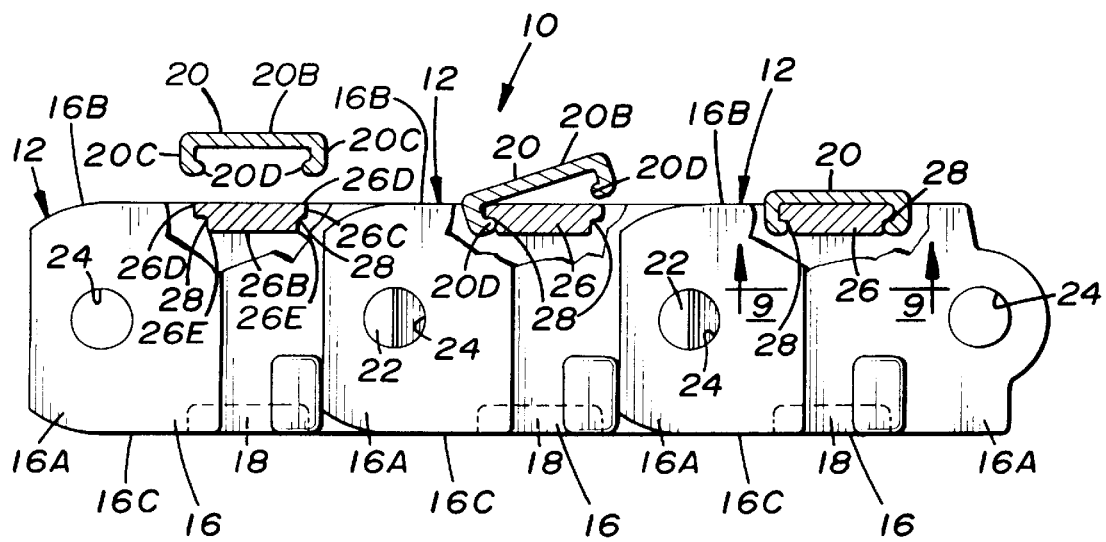

CARRIER LINK HAVING REMOVABLE CROSSBAR WITH OPPOSITE ENDS SNAP-FITTED ON CROSS-SECTIONALLY T-SHAPED PROTRUSIONS

BACKGROUND OF THE INVENTION

1. Field of the Invention

The present invention generally relates to cable and hose management products and, more particularly, is concerned with a carrier link employing a removable channel-shaped crossbar with its opposite ends snap-fitted over and into recesses on a pair of cross-sectionally T-shaped protrusions that are attached to and project toward one another from opposite sidewalls of the carrier link.

2. Description of the Prior Art

Gleason Reel Corp. of Mayville, Wis., a subsidiary of Hubbell Corporation of Stonington, Conn., manufactures and sells various products which address the management of various cable and hose that power and control moving machines of all types. One particular product is an elongated carrier identified in the commercial marketplace by the registered trademark PowerTrak GRP. This carrier holds and protects the lengths of cable and hose but is sufficiently flexible so as to accommodate relative movements of the machine and parts thereof. This carrier is comprised of a plurality of links pivotally interconnected together so as to define a continuous longitudinal passageway through the carrier for receiving and holding the lengths of cable and hose. Typically, each link has a pair of sidewalls and a pair of crossbars vertically spaced apart and extending transversely between and interconnecting the sidewalls adjacent to opposite upper and lower edge portions of the sidewalls so as to laterally space apart the sidewalls. The pair of sidewalls of each link defines therebetween a segment of the continuous passageway of the carrier which is disposed end-to-end between the segments of adjacent links to comprise the continuous passageway. The pair of crossbars together with the pair of sidewalls define an opening therebetween within the passageway segment of the link. To be moved along the continuous passageway of the carrier relative to the carrier, the cable and hose together must have a cross-sectional footprint which will fit within the limits of such opening as determined by the spacing of sidewalls and crossbars of each link.

A problem arises with carriers of this general construction when the lengths of cable and hose have connectors or the like which are slightly too large to fit between the crossbars of the links. Such lengths of cables and hose cannot be fed, as desired, from one end to the other end of the carrier through the continuous longitudinal passageway thereof for their installation or removal. One approach taken in the prior art to solving this problem is to make one of the crossbars of each link removable so as to open one side of the passageway allowing the cable or hose to be removed from the carrier or installed into the carrier without disturbing the connectors at the ends thereof.

U.S. Pat. No. 5,038,556 to Moritz et al discloses different embodiments of links with removable crossbars. In several of the embodiments, tubular crossbars of oblong configuration in cross-section fit at their opposite ends with similarly cross-sectionally shaped protrusions or recesses on the opposite sidewalls of the link. Some of these tubular crossbars have longitudinal slots which can be forcibly widened to facilitate removal of the tubular crossbars from the protrusions and recesses. In one embodiment, a cross-sectionally channel-shaped crossbar fits partially around the protrusions. The channel-shaped crossbar has a longitudinal groove extending externally along one leg of the crossbar to receive a screwdriver tip in order to remove the crossbar.

The approach taken in the different embodiments of links in the Moritz et al patent appears to be a step in the right direction toward solving the above-mentioned problem. However, the designs proposed appear to fall short of an optimum solution in terms of ease of use and materials and manufacturing costs. Consequently, a need still exists for an innovation which will avoid the problems of the prior art without introducing new problems in their place.

SUMMARY OF THE INVENTION

The present invention provides to a carrier link designed to satisfy the aforementioned need. The carrier link employs a removable crossbar having opposite ends snap-fittable over and partially about an outer portion of, and into a pair of opposite inner corner recesses on, a pair of protrusions being cross-sectionally T-shaped and attached to and projecting toward one another from the opposite sidewalls of the carrier link. By fitting within the corner recesses on the cross-sectional T-shaped protrusions to grip the protrusions, the opposite ends of the removable crossbar do not project beyond the bottom surfaces of the protrusions and therefore do not reduce the height of nor occupy space in the opening of the link. The opposite ends of the crossbar also have beveled tip portions which facilitate ease of snap-fit engagement and disengagement of the crossbar with and from the cross-sectional T-shaped protrusions. The crossbar can be manufactured by well-known low-cost extrusion techniques that require minimum investment in production tooling. The protrusions can be provided on the links by reworking current carrier link molds or current molded parts also at minimal additional investment. This snap-fit type connection permits easy manual installation and removal of the crossbar without the need for tools and while still maintaining a strong connection.

Accordingly, the present invention is directed to a link for an elongated carrier for holding and protecting lengths of cable and hose. The link includes (a) a pair of sidewalls pivotally connectable to corresponding sidewalls of adjacent links in the carrier, the sidewalls having opposite upper and lower portions and a pair of protrusions being cross-sectionally T-shaped and attached to and projecting toward one another from one of the opposite upper and lower portions of the sidewalls, each of the protrusions having spaced apart opposite outer and inner portions, spaced apart opposite side portions extending between and forming outer and inner pairs of corners with the opposite outer and inner portions, and recesses defined respectively at the one of the outer and inner pairs of corners adjacent to one of the opposite outer and inner portions of the protrusion so as to provide the cross-sectional T-shape of the protrusion; and (b) a pair of crossbars vertically spaced apart and extending transversely between the sidewalls adjacent to the opposite upper and lower portions thereof so as to laterally space the sidewalls apart from one another, one of the crossbars being fixedly attached to and extending between the other of the opposite upper and lower portions of the sidewalls, the other of the crossbars being removable and having opposite ends removably snap-fittable over and partially about the other of the outer and inner portions and opposite side portions of the protrusions and into the pair of recesses at the one pair of corners on the protrusions adjacent to the one of the outer and inner portions of the protrusion. More particularly, the removable crossbar is cross-sectional ly channel-shaped and has a pair of ledges protruding toward one another at each of the opposite ends of the removable crossbar. Each of the ledges has an end portion snap-fittable with the recess at each of the one pair of corners on the protrusions. The end portion of each ledge further has a beveled tip facilitating ease of snap-fittable engagement and disengagement of the end portion of each of the ledges with and from the recess at each of the one pair of corners on the protrusions. Furthermore, the end portion of each of the ledges is snap-fittable within the recess at each of the one pair of corners on the protrusion such that the end portions of the ledges positively grip the protrusions without projecting beyond the one of the outer and inner portions of the protrusions.

The present invention is also directed to an elongated carrier for holding and protecting lengths of cable and hose wherein the carrier comprises: (a) a plurality of substantially identical links disposed in an end-to-end arrangement, each of the links having the construction as described above; and (b) means such as pivot pins and apertures for receiving the pivot pins are provided on the respective opposite end portions of the sidewalls for pivotally interconnecting the opposite ends portions of the sidewalls of one link to corresponding opposite end portions of the sidewalls of adjacent links in the end-to-end arrangement thereof.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 6 is a top plan view of the link of FIG. 2 with the crossbar removed.

FIG. 7 is a longitudinal sectional view of the link taken along line 7—7 of FIG. 6.

FIG. 8 is a fragmentary side elevational view of several pivotally connected links of the carrier showing the steps of snap-fit installing of the crossbars onto the protrusions of the links.

FIG. 9 is a fragmentary bottom plan view with portions in sectional form of the installed crossbar taken along line 9—9 of FIG. 8.

FIG. 10 is a cross-sectional view of the installed crossbar taken along line 10—10 of FIG. 9.

DETAILED DESCRIPTION OF THE INVENTION

Figure 1:
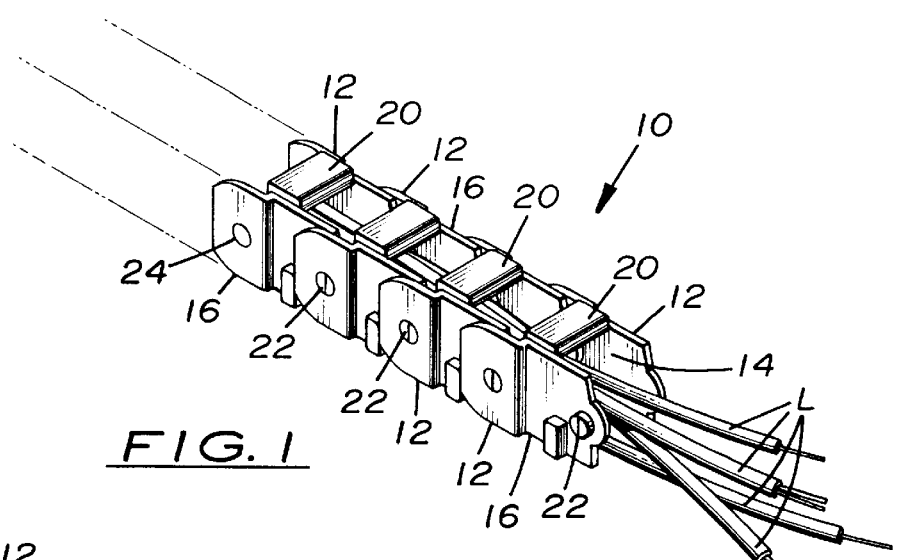
FIG. 1 is a fragmentary perspective view of a carrier for lengths of cable and hose and the like incorporating pivotally connected links employing the features of the present invention.
Figure 2:
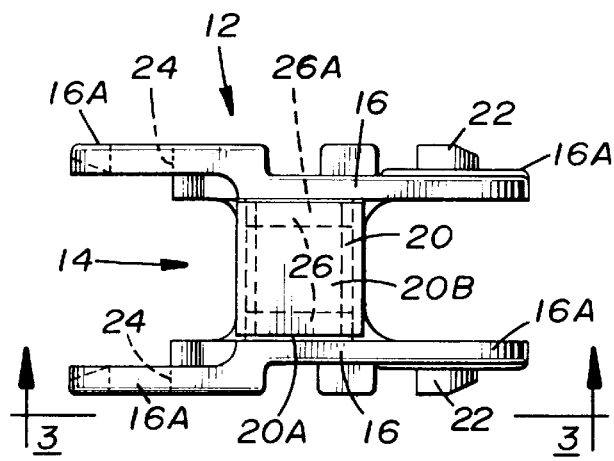
FIG. 2 is a top plan view of one of the links of the carrier of FIG. 1 showing the removable crossbar and pair of protrusions having the features of the present invention thereon.
Figure 5:
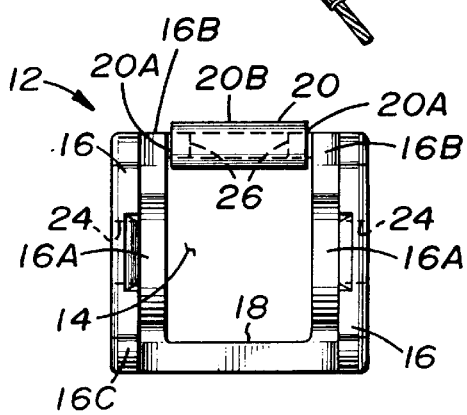
FIG. 5 is a left end elevational view of the link as seen along line 5—5 of FIG. 2.
Figure 3:
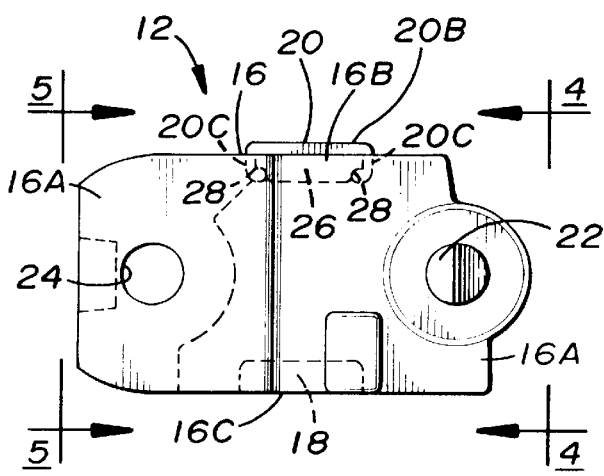
FIG. 3 is a side elevational view of the link as seen along line 3—3 of FIG. 2.
Figure 4:
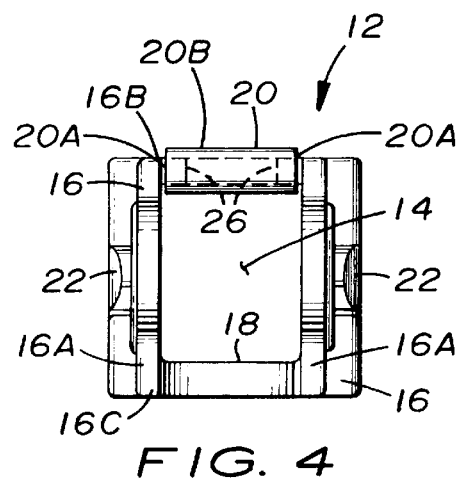
FIG. 4 is a right end elevational view of the link as seen along line 4—4 of FIG. 2.

In the following description, like reference characters designate like or corresponding parts throughout the several views of the drawings. Also in the following description, it is to be understood that such terms as "forward", "rearward", "top", "bottom", "right", "left", and the like are words of convenience and are not to be construed as limiting terms.

Referring to the drawings and particularly to FIG. 1, there is illustrated an elongated carrier, generally designated 10, which is comprised of a plurality of substantially identical links 12 being pivotally interconnected together in an end-to-end arrangement so as to define a continuous longitudinal passageway 14 extending through the elongated carrier 10. The elongated carrier 10 holds and protects a plurality of lengths L of cable and hose within the passageway 14. However, the elongated carrier 10 is sufficiently flexible to accommodate relative movements of a machine and parts thereof to which the elongated carrier 10 and its protected lengths L of cable and hose are coupled. Some or all of the links 12 comprising the elongated carrier 10 can advantageously incorporate the features of the present invention which are described hereinafter.

Referring to FIGS. 2 to 7, each link 12 of the elongated carrier 10 basically includes a pair of substantially identical sidewalls 16, a fixed crossbar 18 and a removable crossbar 20. The sidewalls 16 of each link 12 has opposite end portions 16A and upper and lower edge portions 16B, 16C extending between the opposite end portions 16A. Means for pivotally interconnecting the opposite end portions 16A of the sidewalls 16 of adjacent links 12 of the elongated carrier 10 to one another in the end-to-end arrangement take the form of pivot pins 22 and apertures 24. The pivot pins 22 are integrally attached to one of the opposite end portions 16A of the sidewalls 16 of the link 12 and the apertures 24 are defined in the other of the opposite end portions 16A of the sidewalls 16 of the link 12 for receiving the pivot pins 22. The fixed and removable crossbars 18, 20 of each link 12 are vertically spaced apart from one another and extend transversely between the sidewalls 16 adjacent to the opposite upper and lower edge portions 16B, 16C thereof so as to laterally space the sidewalls 16 apart from one another.

The sidewalls 16 of each link 12 have a pair of substantially identical protrusions 26 which are attached adjacent to and project toward one another from one of the opposite upper and lower edge portions 16B, 16C of the sidewalls 16. The protrusions 26 are relatively short in axial length and so are spaced laterally from one another and extend only a short distance into the longitudinal passageway 14 defined between the sidewalls 16 of the links 12. In the illustrated embodiment, the protrusions 26 are attached adjacent to and project inwardly toward one another from the respective upper edge portions 16B of the sidewalls 16. However, alternatively, the protrusions 26 can be attached adjacent to and project inwardly from the lower edge portions 16C of the sidewalls 16. Each of the protrusions 26 has spaced apart opposite outer and inner portions 26A, 26B, spaced apart opposite side portions 26C extending between and forming outer and inner pairs of corners 26D, 26E with the opposite outer and inner portions 26A, 26B, and recesses 28 defined respectively at one of the outer and inner pairs of corners 26D, 26E so as to provide the cross-sectional T-shape of the protrusion 26. In the illustrated embodiment, the recesses 28 are defined at the inner pairs of corners 26E of the protrusions 26. However, the recesses alternatively can be defined at the outer pairs of corners 26D of the protrusions 26.

The fixed crossbar 18 of each link 12 is attached to and extends between the other of the opposite upper and lower portions 16B, 16C of the sidewalls 16 opposite from the one of the opposite upper and lower portions 16B, 16C to which the protrusions 26 are attached and extend between. In the illustrated embodiment, the fixed crossbar 18 is fixedly attached to and extends between the lower edge portions 16C of the sidewalls 16. However, the fixed crossbar 18 alternatively can be attached to and project inwardly from the upper edge portions 16B of the sidewalls 16.

The removable crossbar 20 of each of the links 12 employing this feature of the present invention is cross-sectionally channel-shaped and has opposite ends 20A removably snap-fittable over and partially about the other of the outer and inner portions 26A, 26B and opposite side portions 26C of the protrusions 26 and into the pair of recesses 28 at the inner pairs of corners 26D on the protrusions 26. More particularly, the removable crossbar 20 has a central flat body 20B, a pair of lengthwise opposite edges 20C, and ledges 20D attached thereon, extending therealong, and protruding inwardly therefrom toward one another. The ledges 20D have opposite end portions 20E being snap-fittable within the recesses 28 at the inner pairs of corners 26D on the protrusions 26 such that the opposite end portions 20E of the ledges 20D positively grip the protrusions 26 without projecting beyond the adjacent inner portions 26B of the protrusions 26. Also, the opposite end portions 20E of the ledges 20D have beveled tips 20F facilitating ease of the snap-fittable engagement and disengagement of the opposite end portions 20E of the ledges 20D with and from the recesses 28 at the inner pairs of corners 26D on the protrusions 26.

Referring now to FIGS. 8 to 10, there is illustrated several pivotally connected links 12 of the elongated carrier 10 showing the steps of snap-fittable installing of the removable crossbars 20 onto the protrusions 26 of the links 12. The ledge 20D on one of the lengthwise opposite edges 20C of the removable crossbar 20 is placed within corresponding aligned ones of the corner recesses 28 on the protrusions 26. Then the removable crossbar 20 is pivoted downward into contact with the corresponding aligned ones of the opposite side portions 26C of the protrusions 26. By application of pressure on the removable crossbar 20 it will flex so as to easily snap fit onto the protrusions 26 such that the ledge 20D on the other of the lengthwise opposite edges 20C of the removable crossbar 20 will snap fit into the corresponding aligned others of the corner recesses 28 on the protrusions 26. By manually prying with one's finger upwardly along one of the lengthwise opposite edges 20C of the removable crossbar 20 it will flex and release its snap fit engagement on the protrusions 26.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A link for an elongated carrier for holding and protecting lengths of cable and hose, said link comprising:
   (a) a pair of sidewalls pivotally connectable to corresponding sidewalls of adjacent links in the carrier, said sidewalls having opposite upper and lower portions and a pair of protrusions being cross-sectionally T-shaped and attached to and projecting toward one another from one of said opposite upper and lower portions of said sidewalls, each of said protrusions having spaced apart opposite outer and inner portions, spaced apart opposite side portions extending between and forming outer and inner pairs of corners with said opposite outer and inner portions, and recesses defined respectively at the one of said outer and inner pairs of corners adjacent to one of the opposite outer and inner portions of the protrusion so as to provide said cross-sectional T-shape of said protrusion; and
   (b) a pair of crossbars vertically spaced apart and extending transversely between said sidewalls adjacent to said opposite upper and lower portions thereof so as to laterally space said sidewalls apart from one another, one of said crossbars being fixedly attached to and extending between the other of said opposite upper and lower portions of said sidewalls, the other of said crossbars being removable and having opposite ends removably snap-fittable over and partially about the other of said outer and inner portions and opposite side portions of said protrusions and into said pair of recesses on said one pair of corners of said protrusions adjacent to said one of said outer and inner portions of said protrusions.

2. The link as recited in claim 1, wherein said removable crossbar has a pair of opposite edges and ledges attached along said opposite edges and protruding therefrom and inwardly toward one another.

3. The link as recited in claim 1, wherein said removable crossbar is cross-sectionally channel-shaped and has a pair of ledges protruding toward one another at each of said opposite ends of said removable crossbar, each of said ledges has an end portion snap-fittable with said recess at each of said one pair of corners on said protrusions.

4. The link as recited in claim 3, wherein each of said ledges has an end portion with a beveled tip facilitating ease of snap-fittable engagement and disengagement of said end portion of each of said ledges with and from said recesses at said one pair of corners on said protrusions.

5. The link as recited in claim 3, wherein each of said ledges has an end portion snap-fittable within said recess at each of said one pair of corners on said protrusions such that said end portions of said ledges positively grip said protrusions without projecting beyond said one of said outer and inner portions of said protrusions.

6. The link as recited in claim 5, wherein said end portion of each of said ledges has a beveled tip facilitating ease of snap-fittable engagement and disengagement of said end portion of each of said ledges with and from said recesses at said one pair of corners on said protrusions.

7. A link for an elongated carrier for holding and protecting lengths of cable and hose, said link comprising:
   (a) a pair of sidewalls having opposite end portions pivotally connectable to corresponding opposite end portions of sidewalls of adjacent links, said sidewalls also having opposite upper and lower edge portions extending between said opposite end portions and a pair of protrusions being cross-sectionally T-shaped and attached to and projecting toward one another from one of said opposite upper and lower edge portions of said sidewalls, each of said protrusions having spaced apart opposite outer and inner portions, spaced apart opposite side portions extending between said opposite outer and inner portions and forming an inner pair of corners with said inner portion, and recesses defined respectively at said inner pair of corners adjacent to said inner portion of said protrusion so as to provide said cross-sectional T-shape of said protrusion; and
   (b) a pair of crossbars vertically spaced apart and extending transversely between said sidewalls adjacent to said opposite upper and lower edge portions thereof so as to laterally space said sidewalls apart from one another, one of said crossbars being fixedly attached to and extending between the other of said opposite upper and lower edge portions of said sidewalls, the other of said crossbars being removable and cross-sectionally channel-shaped and having opposite ends removably snap-fittable over and partially about said outer portion and opposite side portions of said protrusions and into said pair of recesses on said inner pair of corners of said protrusions adjacent to said inner portions of said protrusions.

8. The link as recited in claim 7, wherein said removable crossbar has a pair of lengthwise opposite edges and ledges attached along said opposite edges and protruding therefrom and inwardly toward one another.

9. The link as recited in claim 8, wherein said ledges have opposite end portions snap-fittable with said recesses at said inner pairs of corners on said protrusions.

10. The link as recited in claim 9, wherein said opposite end portions of said ledges are snap-fittable within said recesses such that said opposite end portions of said ledges positively grip said protrusions without projecting beyond said adjacent inner portions of said protrusions.

11. The link as recited in claim 10, wherein said opposite end portions of said ledges have beveled tips facilitating ease of snap-fittable engagement and disengagement of said opposite end portions of said ledges with and from said recesses at said inner pairs of corners on said protrusions.

12. An elongated carrier for holding and protecting lengths of cable and hose, said carrier comprising:

(a) a plurality of substantially identical links disposed in an end-to-end arrangement, each of said links including (i) a pair of sidewalls having opposite end portions, opposite upper and lower portions extending between said opposite end portions, and a pair of protrusions being cross-sectionally T-shaped and attached to and projecting toward one another from one of said opposite upper and lower portions of said sidewalls, each of said protrusions having spaced apart opposite outer and inner portions, spaced apart opposite side portions extending between and forming outer and inner pairs of corners with said opposite outer and inner portions, and recesses defined respectively at the one of said outer and inner pairs of corners adjacent to one of said outer and inner portions of said protrusion so as to provide said cross-sectional T-shape of said protrusion, and (ii) a pair of crossbars vertically spaced apart and extending transversely between said sidewalls adjacent to said opposite upper and lower portions thereof so as to laterally space apart said sidewalls from one another, one of said crossbars being fixedly attached to and extending between the other of said opposite upper and lower portions of said sidewalls, the other of said crossbars being removable and having opposite ends removably snap-fittable over and partially about the other of said outer and inner portions and opposite side portions of said protrusions and into said pair of recesses on said one pair of corners of said protrusions adjacent to said one of said outer and inner portions of said protrusions; and (b) means for pivotally interconnecting said opposite ends portions of said sidewalls of one of said links to corresponding opposite end portions of said sidewalls of adjacent ones of said links in said end-to-end arrangement thereof.

13. The carrier as recited in claim 12, wherein said means for pivotally interconnecting said opposite end portions of said sidewalls are pivot pins and apertures for receiving said pivot pins being provided on said respective opposite end portions of said sidewalls.

14. The carrier as recited in claim 12, wherein said removable crossbar is channel-shaped in cross-section.

15. The carrier as recited in claim 12, wherein said removable crossbar has a pair of opposite edges and ledges attached along said opposite edges and protruding therefrom and inwardly toward one another.

16. The carrier as recited in claim 15, wherein said removable crossbar is channel-shaped in cross-section.

17. The carrier as recited in claim 12, wherein said removable crossbar is channel-shaped in cross-section and has a pair of opposite ledges protruding inwardly toward one another, each of said ledges having opposite end portions snap-fittable with said recesses at each of said one pair of corners on said protrusions.

18. The carrier as recited in claim 17, wherein each of said opposite end portions of said ledges has a beveled tip facilitating ease of snap-fittable engagement and disengagement of said opposite end portions of said ledges with and from said recesses at said one pair of corners on said protrusions.

19. The carrier as recited in claim 12, wherein said removable crossbar has a pair of ledges protruding inwardly toward one another, each of said ledges having opposite end portions snap-fittable within said recesses at each of said one pair of corners on said protrusions such that said opposite end portions of said ledges positively grip said protrusions without projecting beyond said one of said outer and inner portions of said protrusions.

20. The carrier as recited in claim 19, wherein said opposite end portion of each of said ledges has a beveled tip facilitating ease of snap-fittable engagement and disengagement of said opposite end portions of said ledges with and from said recesses at said one pair of corners on said protrusions.

* * * * *